United States Patent
Qu et al.

(10) Patent No.: US 11,379,578 B1
(45) Date of Patent: Jul. 5, 2022

(54) DETECTING MALWARE BY POOLED ANALYSIS OF SAMPLE FILES IN A SANDBOX

(71) Applicant: Trend Micro Incorporated, Tokyo (JP)

(72) Inventors: Jun Qu, Nanjing (CN); Zhichao Ding, Nanjing (CN); Renkui Tao, Nanjing (CN)

(73) Assignee: TREND MICRO INCORPORATED, Tokyo (JP)

( * ) Notice: Subject to any disclaimer, the term of this patent is extended or adjusted under 35 U.S.C. 154(b) by 61 days.

(21) Appl. No.: 17/072,311

(22) Filed: Oct. 16, 2020

(51) Int. Cl.
*G06F 21/53* (2013.01)
*G06F 21/56* (2013.01)

(52) U.S. Cl.
CPC ............ *G06F 21/53* (2013.01); *G06F 21/565* (2013.01); *G06F 21/566* (2013.01); *G06F 2221/033* (2013.01)

(58) Field of Classification Search
CPC ...... G06F 21/53; G06F 21/565; G06F 21/566; G06F 2221/033; G06F 21/56
See application file for complete search history.

(56) References Cited

U.S. PATENT DOCUMENTS

| 6,967,999 | B2 | 11/2005 | Subramanian et al. |
| 7,085,765 | B2 | 8/2006 | Zock et al. |
| 7,401,013 | B2 | 7/2008 | Vanderwiel |
| 7,640,047 | B2 | 12/2009 | Sakata et al. |
| 8,657,762 | B2 | 2/2014 | Takashima et al. |
| 8,818,735 | B2 | 8/2014 | Braun et al. |
| 10,002,232 | B2 | 6/2018 | Hong et al. |
| 10,643,160 | B2 | 5/2020 | Deshpande et al. |
| 10,699,230 | B2 | 6/2020 | Deshpande et al. |
| 11,163,879 | B2 * | 11/2021 | Langton ............... G06F 21/567 |
| 2017/0109528 | A1 * | 4/2017 | Harris .................. G06F 21/566 |
| 2020/0159925 | A1 * | 5/2020 | Parlak .................. G06F 21/566 |
| 2021/0097171 | A1 * | 4/2021 | McKerchar ........... G06F 40/106 |
| 2021/0117544 | A1 * | 4/2021 | Kurtz ................... G06F 21/566 |

FOREIGN PATENT DOCUMENTS

| CN | 103559441 | A | * | 2/2014 | ............ G06F 21/56 |
| CN | 106055976 | A | * | 10/2016 | ............ G06F 21/53 |
| CN | 110188538 | A | * | 8/2019 | |
| GB | 2543602 | A | * | 4/2017 | ............ G06F 21/50 |

OTHER PUBLICATIONS

Pooling of samples for testing for SARS-CoV-2 in asymtomatic people, Apr. 28, 2020, 2 pages, LancetInfectDis2020.

* cited by examiner

*Primary Examiner* — Jayesh M Jhaveri
(74) *Attorney, Agent, or Firm* — Beyer Law Group LLP

(57) ABSTRACT

Systems and methods are presented for performing sandboxing to detect malware. Sample files are received and activated individually in separate sandboxes in one mode of operation. In another mode of operation, sample files are assigned to pools. Sample files of a pool are activated together in the same sandbox. The sample files of the pool are deemed to be normal when no anomalous event is detected in the sandbox. Otherwise, when an anomalous event is detected in the sandbox, the sample files of the pool are activated separately in separate sandboxes to isolate and identify malware among the sample files.

10 Claims, 6 Drawing Sheets

DETECTING MALWARE BY POOLED ANALYSIS OF SAMPLE FILES IN A SANDBOX

BACKGROUND OF THE INVENTION

1. Field of the Invention

The present invention relates generally to cybersecurity, and more particularly but not exclusively to detecting malware by sandbox analysis.

2. Description of the Background Art

Sandbox analysis, also referred to as "sandboxing," is a well-known technique for evaluating files for malware, i.e., malicious software. In sandboxing, a file being evaluated (which is also referred to as a "sample") is activated in a sandbox, which provides a controlled and safe environment for analyzing the behavior and output of the file during runtime. Although highly effective in detecting malware, sandboxing consumes more resources and takes longer time to complete compared to other malware detection techniques. Accordingly, sandboxing is typically employed off-line in cybersecurity applications that are not time-critical.

SUMMARY

In one embodiment, sample files are received and activated individually in separate sandboxes in one mode of operation. In another mode of operation, sample files are assigned to pools. Sample files of a pool are activated together in the same sandbox. The sample files of the pool are deemed to be normal when no anomalous event is detected in the sandbox. Otherwise, when an anomalous event is detected in the sandbox, the sample files of the pool are activated separately in separate sandboxes to isolate and identify malware among the sample files.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
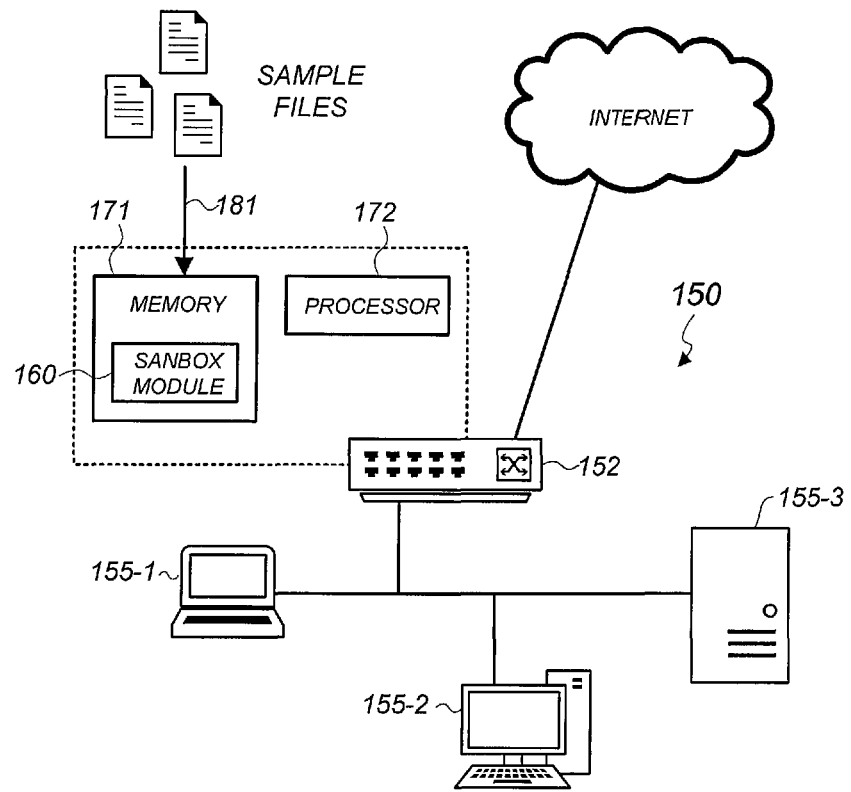
FIG. 1 shows a logical diagram of a private computer network in accordance with an embodiment of the present invention.

FIG. 1 shows a logical diagram of a private computer network 150 in accordance with an embodiment of the present invention. In the example of FIG. 1, the private computer network 150 includes an on-premise security computer 152 and a plurality of computers 155 (i.e., 155-1, 155-2, 155-3, etc.). A computer 155 may comprise a desktop computer, server computer, mobile computer, or other computing device that is typically found in a computer network. The private computer network 150 may be that of a private corporation, government, individual, or other entity. The private computer network 150 is "private" in that it is not accessible by the general public.

In the example of FIG. 1, the security computer 152 monitors all network traffic going to and coming out of the private computer network 150. The security computer 152 may comprise a server computer, an appliance, gateway, or other computing device that is employed in cybersecurity applications. The security computer 152 comprises a memory 171 (e.g., random access memory (RAM), non-volatile memory) and a processor 172 (e.g., central processing unit (CPU), microprocessor).

In the example of FIG. 1, the security computer 152 includes a sandbox module 160. In one embodiment, the sandbox module 150 comprises instructions that are stored in the memory 171 for execution by the processor 172 to perform one or more functions of the security computer 152. As can be appreciated, the functionality of the security computer 152 may also be distributed among several computers.

In one embodiment, the security computer 152 is configured, by executing the sandbox module 160, to detect malware by sandboxing. More particularly, the security computer 152 is configured to receive a plurality of sample files (see arrow 181) and activate the sample files in sandboxes to evaluate the sample files for malware.

A sample file may be activated by executing the sample file, opening the sample file, or other way of accessing or interacting with the sample file. The sample files may be portable executable (PE) files, Executable Linkable Format (ELF) files, scripts, portable document format (PDF) files, or other types of files exploited by cybercriminals.

A sample file, i.e., a file being evaluated for malware by sandboxing, is also referred to herein simply as a "sample."

The security computer 152 performs in-line sandboxing in that it performs sandbox analysis on samples as they are received in the private computer network. Unlike off-line sandboxing, which is typically performed in the cloud (i.e., over the Internet) with manageable time constraints, the security computer 152 needs to be able to detect malware in an amount of time that minimizes negative impact on latency of network traffic on the private computer network. That is, the security computer 152 needs to be able to perform sandboxing at relatively high throughput.

Generally speaking, detecting malware by sandboxing is well-known. Briefly, a sandbox may be an instance of a virtual machine. A host computer, such as the security computer 152, may run a plurality of virtual machine instances, each virtual machine instance implementing a sandbox, and each sandbox being isolated from other sandboxes. A sandbox may include critical resources, such as files, network ports, and other resources that serve as baits to attract malware. The sandbox may be instrumented to detect anomalous events that are indicative of malware, such as unauthorized or suspicious access to critical resources, behavior indicative of malware activity, etc. When an anomalous event is detected during activation of a single sample in the sandbox, the sample is presumed to be the cause of the anomalous event and is thus detected to be malware. In general, by activating only one sample per sandbox, any anomalous event in the sandbox may be attributed to the sample. Embodiments of the present invention may employ any suitable conventional algorithm for detecting anomalous events in a sandbox.

In one embodiment, the security computer 152 is configured to perform sandboxing in at least two modes of operation. In a first mode of operation, which is also referred to as "individual sandboxing," each sample is activated in its own sandbox separately from other samples. This makes it relatively easy to determine whether or not a sample is malware, because there is only one sample in the sandbox. That is, any anomalous event detected in the sandbox indicates that the sample is malware.

In a second mode of operation, which is also referred to as "pooled sandboxing," a plurality of samples is activated together as a pool in the same sandbox in a first round of sandboxing. In the second mode of operation, when no anomalous event is detected in the sandbox, each sample of the pool is deemed to be normal (i.e., non-malicious). Otherwise, when an anomalous event is detected in the sandbox, each sample of the pool is activated separately in its own sandbox in a second round of sandboxing. This way, the sample that caused the pool to fail the first round of sandboxing may be isolated and identified. The second mode of operation (i.e., pooled sandboxing) may take less time and consume less resources than the first mode of operation (i.e., individual sandboxing).

Figure 2:
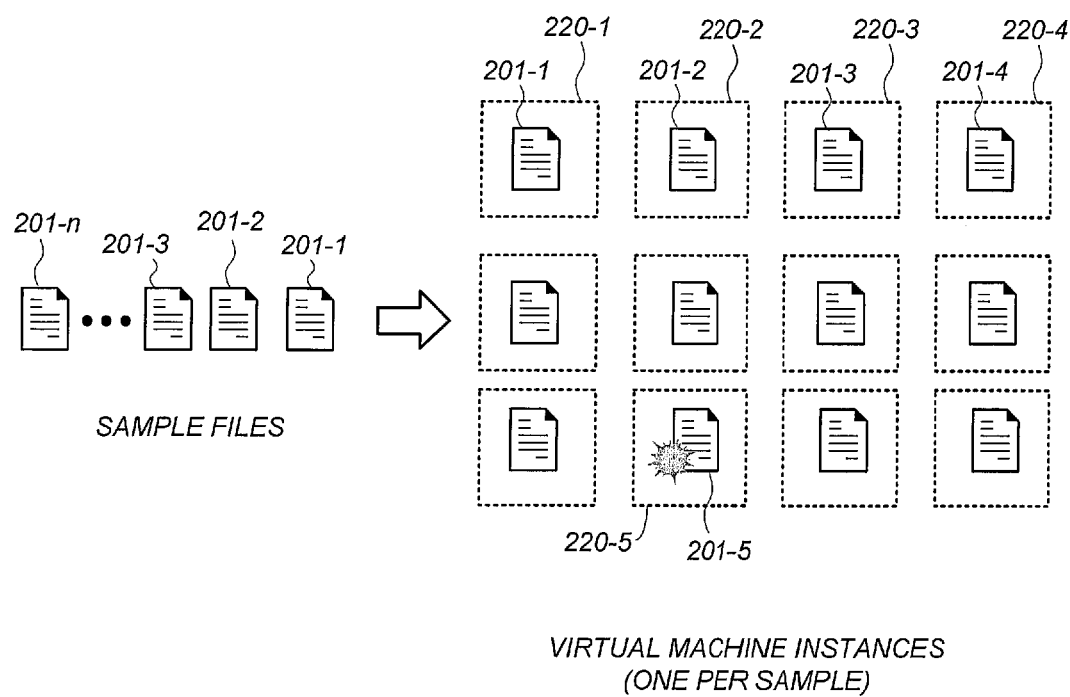
FIG. 2 illustrates a first mode of operation of a security computer in accordance with an embodiment of the present invention.

FIG. 2 illustrates a first mode of operation of the security computer 152, by executing the sandbox module 160, in accordance with an embodiment of the present invention. In the example of FIG. 2, samples 201 (i.e., 201-1, 201-2, 201-3, . . . ) are received by the security computer 152. In the example of FIG. 2, the security computer 152 runs a plurality of sandboxes 220 (i.e., 220-1, 220-2, 220-3, . . . ) for performing sandbox analysis on the samples 201. In one embodiment, each sandbox 220 is implemented as a virtual machine instance. In general, the number of sandboxes that can be hosted by a computer will depend on its computing resources, such as available memory and processor capability. That is, there is a limited number of sandboxes that can be hosted by the security computer 152.

In the example of FIG. 2, in the first mode of operation of the security computer 152, each sample 201 is activated in its own, separate sandbox 220. More particularly, a single sandbox 220 is allocated for each sample 201. In the example of FIG. 2, the sample 201-1 is activated in the sandbox 220-1, the sample 201-2 is activated in the sandbox 220-2, etc. As previously noted, activating a single sample in its own, separate sandbox facilitates malware identification. Here, in the example of FIG. 2, an anomalous event is detected in the sandbox 220-5 during activation of the sample 201-5. The sample 201-5, being the only sample activated in the sandbox 220-5 at the time, is presumed to have caused the anomalous event and is thus detected to be malware.

Figure 3:
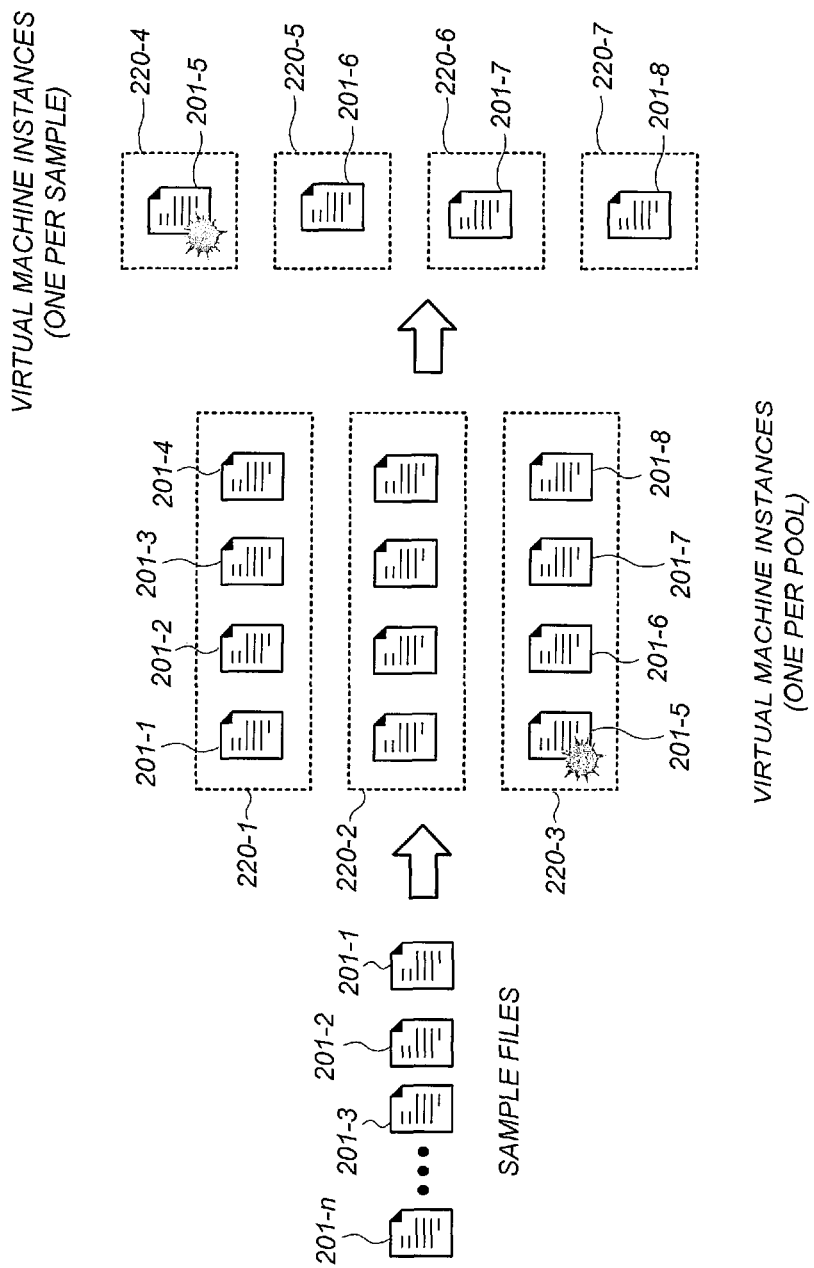
FIG. 3 illustrates a second mode of operation of a security computer in accordance with an embodiment of the present invention.

FIG. 3 illustrates a second mode of operation of the security computer 152, by executing the sandbox module 160, in accordance with an embodiment of the present invention. In the example of FIG. 3, the samples 201 are received by the security computer 152. As before, the security computer 152 runs a plurality of sandboxes 220, where each sandbox 220 is implemented as a virtual machine instance.

In the example of FIG. 3, in the second mode of operation of the security computer 152, the samples 201 are assigned to pools. In one embodiment, each sample 201 is randomly assigned to a pool and, in a first round of sandboxing, all samples assigned to the pool are activated together in the same sandbox 220. In the example of FIG. 3, the samples 201-1, 201-2, 201-3, and 201-4 have been randomly assigned to the same pool and activated together in the sandbox 220-1; the samples 201-5, 201-6, 201-7, and 201-8 have been randomly assigned to the same pool and activated together in the sandbox 220-3; etc. As can be appreciated, the number of samples that may be activated in the same sandbox and the number of sandboxes that are available for sandboxing will depend on available computing resources.

In the example of FIG. 3, no anomalous event is detected in the sandbox 220-1 during activation of the samples 201-1, 201-2, 201-3, and 201-4 together as a pool in a first round of sandboxing. The pool is thus deemed to have passed sandboxing. In that case, each of the samples 201-1, 201-2, 201-3, and 201-4 is declared to be normal.

In the example of FIG. 3, an anomalous event is detected in the sandbox 220-3 during activation of the samples 201-5, 201-6, 201-7, and 201-8 together as a pool in a first round of sandboxing. The pool is thus deemed to have failed sandboxing.

However, it is relatively difficult to identify which of the samples caused the pool to fail the sandbox analysis. That is, the anomalous event cannot be readily attributed to any of the samples 201-5, 201-6, 201-7, and 201-8. Accordingly, each of the samples 201-5, 201-6, 201-7, and 201-8 is activated in separate sandboxes 220 in a second round of sandboxing.

In the example of FIG. 3, in the second round of sandboxing, the sample 201-5 is activated in the sandbox 220-4, the sample 201-6 is activated in the sandbox 220-5, the sample 201-7 is activated in the sandbox 220-6, and the sample 201-8 is activated in the sandbox 220-7. Each sample is activated by itself (i.e., with no other samples) in the sandbox. In the example of FIG. 3, an anomalous event is detected in the sandbox 220-4 during activation of the sample 201-5 therein. Accordingly, the sample 201-5 is detected to be malware. No anomalous event is detected during activation of the samples 201-6, 201-7, and 201-8 in their respective sandboxes 220. Accordingly, the samples 201-6, 201-7, and 201-8 are deemed to be normal.

In general, sandboxing efficiency can be evaluated by average analysis rounds (i.e., sandboxing rounds) per sample. In individual sandboxing, where each sample is activated by itself in its own sandbox as in the first mode of operation, the average analysis round per sample is always 1. That is, in individual sandboxing, there is always 1 round of sandboxing per sample.

In pooled sandboxing, where samples are activated as a pool in the same sandbox as in the second mode of operation, the sandboxing efficiency may be calculated as follows. In the following discussion, R is the average analysis rounds per sample (i.e., number of sandboxing rounds per sample), M is the malicious rate of the samples (i.e., the percentage of the samples that are malicious), and P is the number of pool elements (i.e., the number of samples assigned to a pool).

For pools with non-malicious samples (also referred to as "non-malicious pool"), the probability that all samples in the pool are not malicious is $(1-M)^P$. These non-malicious samples need only 1 round of sandboxing. The average analysis rounds per sample of a non-malicious pool is 1/P.

For pools with at least one malicious sample (also referred to as "malicious pool"), the probability that at least one sample in the pool is malicious is $1-(1-M)^P$. A pool with at least one malicious sample needs an additional analysis round to isolate the malicious sample. The average analysis rounds per sample of a malicious pool is $$\frac{1}{P} + 1.$$

The total average analysis rounds in the case where there are malicious and non-malicious pools is given by, $$R = \frac{1}{P} \times (1-M)^P + \left(\frac{1}{P} + 1\right) \times [1 - (1-M)^P] = 1 + \frac{1}{P} - (1-M)^P \quad \text{(EQ. 1)}$$

Table 1 below provides example calculations using EQ. 1. In Table 1, the throughput increase is relative to individual sandboxing.

TABLE 1

| Malicious Rate (M) | Best Pool Size (P) | Average Rounds (R) | Throughput Increase |
|---|---|---|---|
| 0.1% | 31 | 0.0628 | 15.92x |
| 0.5% | 14 | 0.1391 | 7.19x |
| 1% | 10 | 0.1956 | 5.11x |
| 5% | 4 | 0.4262 | 2.35x |
| 10% | 3 | 0.5939 | 1.68x |
| 20% | 2 | 0.8213 | 1.22x |
| 30% | 2 | 0.9903 | 1.01x |
| 40% | ∞ | 1.0101 | 0.99x |

Figure 4:
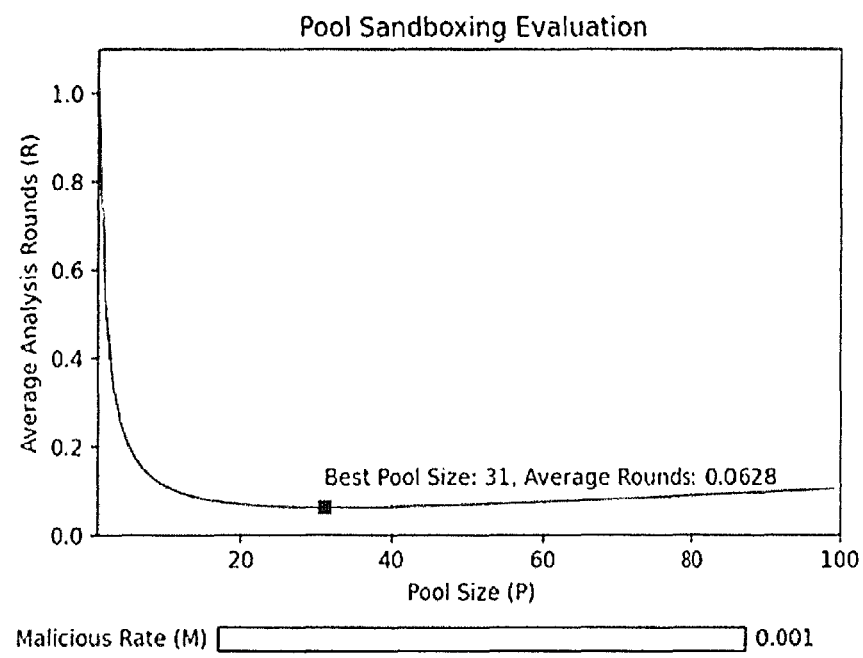
FIG. 4 shows a graph of average analysis rounds versus pool size.

Referring to Table 1, if the malicious rate is 0.1% (M=0.001), the best pool size P is 31, the best average rounds per sample R is 0.0628, and pooled sandboxing has nearly 16 times better throughput compared to individual sandboxing. FIG. 4 shows a graph of average analysis rounds versus pool size for a malicious rate of 0.1%.

Figure 5:
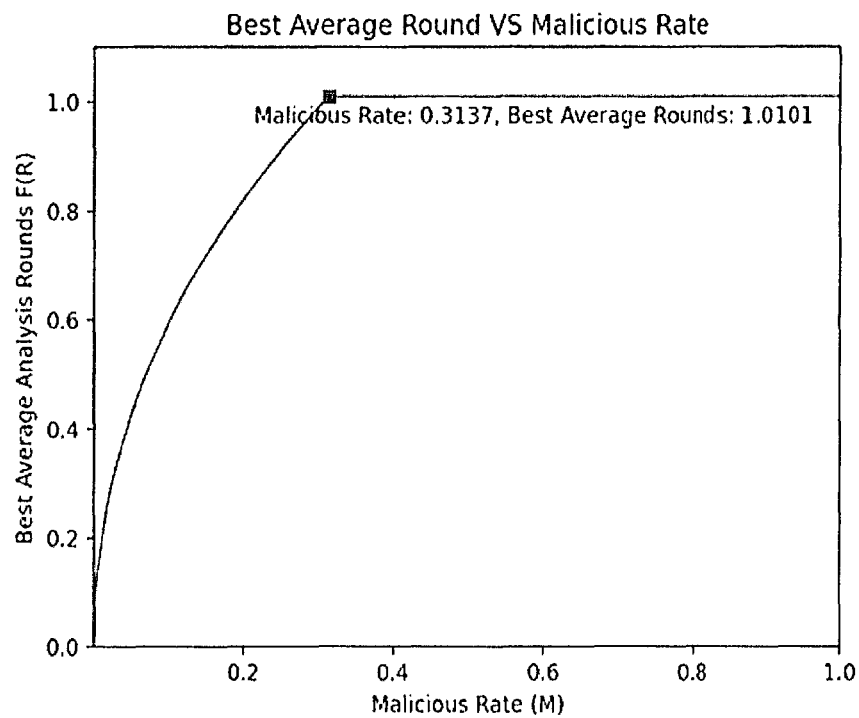
FIG. 5 shows a graph of best average analysis rounds versus malicious rate.

FIG. 5 shows a graph of best average analysis rounds versus malicious rate. Referring to FIG. 5, if the malicious rate exceeds 31.37%, the best average analysis rounds exceeds 1. Therefore, pooled sandboxing provides no benefit over individual sandboxing if the malicious rate exceeds 31.37%.

Figure 6:
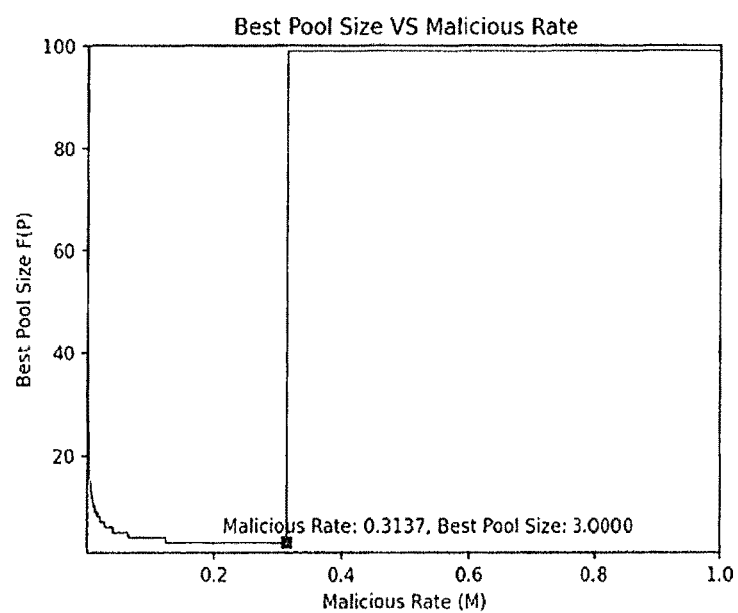
FIG. 6 shows a graph of best pool size versus malicious rate.

FIG. 6 shows a graph of best pool size versus malicious rate. Referring to FIG. 6, if the malicious rate exceeds 31.37%, the best pool size approaches infinity. Again, this shows that pooled sandboxing provides no benefit over individual sandboxing if the malicious rate exceeds 31.37%.

From the above calculations performed by the inventors, pooled sandboxing provides significant throughput improvement over individual sandboxing when the malicious rate is low enough, e.g., malicious rate that is less than 10%. As the malicious rate becomes lower, the throughput improvement over individual sandboxing exponentially (rather than linearly) increases.

Figure 7:
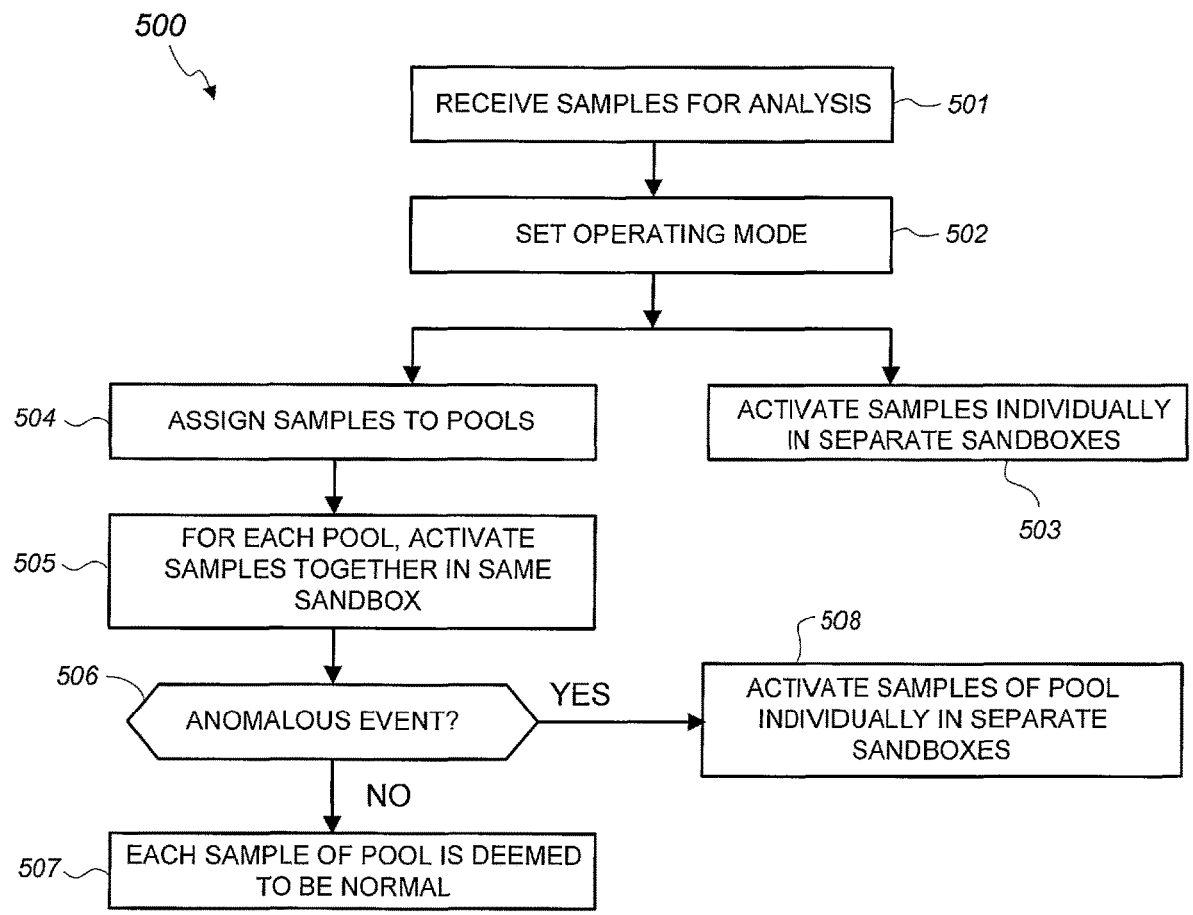
FIG. 7 shows a flow diagram of a method of detecting malware by sandboxing in accordance with an embodiment of the present invention.

FIG. 7 shows a flow diagram of a method 500 of detecting malware by sandboxing in accordance with an embodiment of the present invention. The method 500 is explained using previously described components for ease of illustration. Other components may also be employed without detracting from the merits of the present invention.

In the example of FIG. 7, a security computer receives a plurality of sample files for sandbox analysis (step 501). The sample files may be received over a computer network, for example. The security computer may operate to perform individual sandboxing on the sample files in accordance with a first mode of operation and to perform pooled sandboxing on the sample files in accordance with a second mode of operation. The mode of operation may be set to take advantage of pooled sandboxing in situations where pooled sandboxing provides throughput advantage over individual sandboxing (step 502).

In one embodiment, the security computer performs pooled sandboxing for specific file types. This advantageously allows pooled sandboxing to be performed on types of sample files that have relatively low malicious rate. The malicious rate of specific file types may be obtained from historical information gathered by the security computer or other source. For example, assuming that PDF files have a malicious rate below a threshold rate, the security computer may perform pooled sandboxing for PDF files. In the same example, assuming that PE files have a malicious rate above the threshold rate, the security computer may perform individual sandboxing, instead of pooled sandboxing, on PE files.

In one embodiment, the security computer performs pooled sandboxing based on time of day, network traffic volume, and/or workload. More particularly, the security computer may perform pooled sandboxing on all sample files during predetermined peak hours, when network traffic volume is relatively high, and/or when the security computer is running out of resources. Otherwise, the security computer performs individual sandboxing on all samples.

In one embodiment, the security computer performs pooled sandboxing during generation of virtual machine instances, which is also referred to as "scaling out." As an example, it may take up to 17 minutes for a virtual machine instance to be ready to perform sandboxing. The security computer may perform pooled sandboxing during scaling out and revert to individual sandboxing when a suitable number of virtual machine instances becomes available.

When the security computer is set to perform individual sandboxing on the sample files, the sample files are activated individually in separate sandboxes (step 502 to step 503). That is, one sample file is activated in one sandbox. A sandbox where an anomalous event is detected during activation of a sample file indicates that the sample file is malware. Individual sandboxing readily allows for identification of the sample file that caused the anomalous event, because there is only one sample file activated per sandbox.

When the security computer is set to perform pooled sandboxing on the sample files, the sample files are assigned to pools (step 502 to step 504). In one embodiment, each of the sample files is randomly assigned to one of a plurality of pools. For each pool, the sample files assigned to the pool are activated together in the same sandbox (step 505). When no anomalous event is detected in the sandbox, all sample files assigned to the pool and activated together in the sandbox are deemed to be normal (step 506 to step 507). Otherwise, when anomalous event is detected in the sandbox, all sample files assigned to the pool are activated individually in separate sandboxes (step 506 to step 508). More particularly, one sample file is activated per sandbox and a sandbox where an anomalous event is detected indicates that the sample file running in the sandbox is malware.

The security computer 152 is described above as being in-line and on premise in the private computer network 150. It is to be noted that the functionality of the security computer 152 may also be implemented as part of a cloud computing infrastructure. Furthermore, the functionality of the security computer 152 may be performed in-the-cloud to perform off-line sandboxing. As explained above, pooled sandboxing has throughput advantages over individual sandboxing and may thus be performed when individual sandboxing is not possible, the malicious rate of samples is below a threshold rate, when cost-benefit ratio favors pooled sandboxing, or other reasons particular to the cybersecurity application. As can be appreciated, these advantages apply whether pooled sandboxing is performed in-line or off-line.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting malware by sandboxing, the method comprising:
    assigning a plurality of sample files to a plurality of pools;
    executing a first set of sample files assigned to a first pool of the plurality of pools together in a first sandbox;
    in response to detecting an anomalous event in the first sandbox during said execution of the first set of sample files, executing each of the first set of sample files individually in separate sandboxes such that each of the first set of sample files is executed in one of the separate sandboxes; and
    in response to detecting an anomalous event in a second sandbox from among the separate sandboxes where a particular sample file of the first set of sample files is executed individually and separate from other sample files of the first set of sample files, detecting the particular sample file to be malware.

2. The method of claim 1, further comprising:
    activating a second set of sample files assigned to a second pool of the plurality of pools together in a third sandbox;
    in response to not detecting an anomalous event in the third sandbox during activation of the second set of sample files, deeming each sample file of the second set of sample files to be normal.

3. The method of claim 1, wherein the plurality of sample files is randomly assigned to the plurality of pools.

4. The method of claim 1, wherein the sample files comprise executable files.

5. A computer comprising a memory and a processor, the memory storing instructions that when executed by the processor cause the computer to:
    assign a plurality of sample files to a plurality of pools;
    execute a first set of sample files assigned to a first pool of the plurality of pools together in a first sandbox;
    in response to detecting an anomalous event in the first sandbox during said execution of the first set of sample files, execute each of the first set of sample files individually in separate sandboxes to identify which of the first set of sample files is malware such that each of the first set of sample files is executed in one of the separate sandboxes; and
    in response to detecting an anomalous event in a second sandbox from among the separate sandboxes where a particular sample file of the first set of sample files is executed individually and separate from other sample files of the first set of sample files, detect that the particular sample file is malware.

6. The computer of claim 5, wherein the instructions stored in the memory, when executed by the processor, cause the computer to:
    activate a second set of sample files assigned to a second pool of the plurality of pools together in a third sandbox;
    in response to not detecting an anomalous event in the third sandbox during activation of the second set of sample files, deem each sample file of the second set of sample files to be normal.

7. The computer of claim 5, wherein the plurality of sample files is randomly assigned to the plurality of pools.

8. The computer of claim 5, wherein the sample files comprise executable files.

9. The computer of claim 5, wherein the first sandbox and the separate sandboxes each comprises a virtual machine instance.

10. A method of detecting malware by sandboxing, the method comprising:
    receiving a first set of sample files assigned to a first pool;
    in a first mode of operation, executing each of the first set of sample files individually and separately in different sandboxes to evaluate the first set of sample files for malware;
    receiving a second set of sample files;
    in a second mode of operation:
        assigning the second set of sample files to a second pool;
        executing the second set of sample files together in a first sandbox;
        in response to detecting an anomalous event in the first sandbox during said execution of the second set of sample files, executing each of the second set of sample files individually in separate sandboxes to detect malware in the second set of sample files such that each of the second set of sample files is executed in one of the separate sandboxes; and
        in response to detecting an anomalous event in a second sandbox from among the separate sandboxes where a particular sample file of the second set of sample files is executed individually and separate from other sample files of the second set of sample files, detecting that the particular sample file is malware.

* * * * *